(12) United States Patent
Yoon

(10) Patent No.: US 11,494,161 B2
(45) Date of Patent: Nov. 8, 2022

(54) CODING SYSTEM AND CODING METHOD USING VOICE RECOGNITION

(71) Applicant: Jong Sik Yoon, Busan (KR)

(72) Inventor: Jong Sik Yoon, Busan (KR)

( * ) Notice: Subject to any disclaimer, the term of this patent is extended or adjusted under 35 U.S.C. 154(b) by 438 days.

(21) Appl. No.: 16/485,770

(22) PCT Filed: Feb. 8, 2018

(86) PCT No.: PCT/KR2018/001708
§ 371 (c)(1),
(2) Date: Aug. 13, 2019

(87) PCT Pub. No.: WO2018/151464
PCT Pub. Date: Aug. 23, 2018

(65) Prior Publication Data
US 2020/0026488 A1    Jan. 23, 2020

(30) Foreign Application Priority Data

Feb. 14, 2017  (KR) .......................... 10-2017-0019819

(51) Int. Cl.
| | |
|---|---|
| *G06F 3/16* | (2006.01) |
| *G06F 8/40* | (2018.01) |
| *G10L 15/08* | (2006.01) |
| *G06F 8/30* | (2018.01) |
| *G06F 9/44* | (2018.01) |
| *G10L 15/18* | (2013.01) |

(52) U.S. Cl.
CPC ................ *G06F 3/167* (2013.01); *G06F 8/30* (2013.01); *G06F 9/44* (2013.01); *G10L 15/18* (2013.01)

(58) Field of Classification Search
USPC ................ 717/114–165; 704/1–10, 200–275
See application file for complete search history.

(56) References Cited

U.S. PATENT DOCUMENTS

| | | | | |
|---|---|---|---|---|
| 2003/0110040 | A1* | 6/2003 | Holland ................... | G10L 15/26 704/E15.045 |
| 2015/0044642 | A1* | 2/2015 | Resig ................... | G09B 19/0053 434/118 |
| 2015/0279366 | A1* | 10/2015 | Krestnikov ............. | G10L 15/22 704/235 |
| 2017/0039041 | A1* | 2/2017 | Bommireddi ............. | G06F 8/34 |

FOREIGN PATENT DOCUMENTS

| | | | | | |
|---|---|---|---|---|---|
| CN | 103645931 | * | 3/2014 | ............... | G06F 8/72 |
| WO | WO2014115189 | * | 7/2014 | ............... | G06F 9/44 |

* cited by examiner

*Primary Examiner* — Marcellus J Augustin
(74) *Attorney, Agent, or Firm* — Snell & Wilmer L.L.P.

(57) ABSTRACT

The present invention relates to a system and a method for coding. In the present invention, the user may simply process the work of coding using various programming languages on Cloud without a need for the user to use a separate input device, by recognizing oral commands spoken by the user and carrying out the natural language processing comprising morphological analysis, syntactic analysis, semantic analysis, discourse analysis or combinations thereof, and creating and executing the programming code based thereon.

8 Claims, 9 Drawing Sheets

FIG. 6

Speech recognition process (natural language processing analysis)

| Morpheme analyzing unit (322) | Syntax analyzing unit (324) | Semantics analyzing unit (326) | Discourse analyzing unit (326) |
|---|---|---|---|
| Divide the inputted sentence into morpheme unit and attach part of speech | Find syntax units such as subject, object and predicate | Determine whether the sentence make sense | Find what meaning is conveyed along the flow of the dialogue<br>- context structure analysis<br>(relations between the sentences)<br>- intention analysis (actual intention through the context) |
| \<sentence\><br>Combine 1, 2, 3, 4 and allocate it to the object called A<br>\<morpheme analysis\><br>combine + 1, 2, 3, 4 + and + allocate+ it + to + A + called + the object | S<br>NP / \ VP<br>\| / \<br>N V N<br><br>1, 2, 3, 4  Combine  1, 2, 3, 4<br>A        Allocate  A<br>object                   object | 1) Combine 1, 2, 3, 4 and allocate it to the object called A. (o)<br>2) Select one of 'taxi,' 'bus,' and 'car' and allocate it to a numeric variable A. (x) | \<sentence\><br>Combine 1, 2, 3, 4 and allocate it to the object called A.<br><br>A <- c(1, 2, 3, 4)<br>Select R-program command actually intended |

A plurality of programmers are asked to directly read R-program, and through voice recording, diversity of speech programing secured

CODING SYSTEM AND CODING METHOD USING VOICE RECOGNITION

CROSS-REFERENCE TO RELATED APPLICATIONS

This application is the national stage entry of International Application No. PCT/KR2018/001708 filed on Feb. 8, 2018, which claims priority to Korean Patent Application No. 10-2017-0019819 filed on Feb. 14, 2017; the contents of each of the respective applications are incorporated herein by reference in their entireties.

TECHNICAL FIELD

The present invention relates to a system for coding. More specifically, the present invention relates to a system and method for coding with speech recognition that performs programming automatically by oral commands of a user, thereby allowing the user to simply process coding work using various programming languages on Cloud without a need to use a separate input device.

BACKGROUND ART

Recently, due to the development in digital communication technology and sophistication of computers, the age of multimedia has arrived in which visual information such as images and video are processed, transmitted and received simultaneously with existing data and oral information.

Accordingly, along with the need for various software education to increase the skills in using a computer, users' interest is increasing in software and programs related to the recently spotlighted IoT (Internet of Things), web program, application program, Big Data analysis, data mining, statistical analysis, etc.

As explained above, the demand for education for various software and program is considerably increasing, but in case of offline education, because users have to take education at a specific place and time, there were problems that the users were unable to receive education freely at desired times, and that not only are there shortages of manpower to take charge of education and quality materials for education, but also spaces for education are also considerably insufficient and the costs for education were also excessive.

In order to solve such problems, online education having various advantages such as providing mass education, quality education, practice-centered education, and overcoming the restraints in time and space is actively offered, and smart learning services are getting lots of attention where the user can use educational content freely on the go through a user terminal in a mobile form such as smartphones and tablets.

However, when carrying out online education through a user terminal as described above, in the cases of using learning content (for example, R-program, Python, Java, C, etc.) related to programming in which practice or coding work is essential, because the keyboard provided on a user terminal is small, it is not easy for users to input data for programming practice or coding work, and had the inconvenience of connecting it to a keyboard separately sometimes, and as a result, there was a problem of being unable to carry out the programming study in a mobile environment smoothly.

Moreover, because most of educations on software and program currently made online are targeting the general public, the disabled people with moving difficulties had difficulty in receiving practical education on software and program even if they are interested in software and program.

Accordingly, the present invention has a purpose of providing a solution that recognizes oral commands of the user to carry out a natural language processing, and creates and executes programming codes based thereon and automatically processes the work of programming using various programming languages, and thereby can perform program practice or coding work in a Cloud environment, and can overcome the inconvenience of key input.

Next, the prior art in the technical field of the present invention is briefly explained, and then the subject technological matters that the present invention intends to achieve over the prior art are described.

Firstly, the Korean Patent Laid-Open No. 2002-0030156 (Apr. 24, 2002) relates to a control method of computer programs which can control the operation system of a computer and various application programs with just oral commands of the user using speech recognition technology even without an input device operated by hand manipulation such as a keyboard or a mouse, thereby making it possible for disabled people, as well as the general public, to use computer systems and various programs simply.

This prior art provides the effects of carrying out the execution of a program and various functions on a computer without an input device by hand manipulation such as a keyboard or a mouse, but with just orally inputting predetermined commands registered by the user in advance, and in that it executes a program or a function on a computer by inputting a command orally, it is similar to a feature of the present invention that coding work is performed automatically by recognizing oral commands of the user.

However, because the present invention provides a technological feature that recognizes oral commands of the user to carry out the natural language processing, and creates and executes the programming code based thereon and automatically processes the work of programming, in comparison with the technological feature of carrying out the execution of a program and various functions on a computer with just orally inputting the predetermined commands registered by the user in advance, the present invention is clearly different technically from the prior art, in that it carries out a natural language processing of oral commands, and based on this, creates and executes programming codes.

The Korean Patent No. 1213890 (Dec. 18, 2012) relates to a method using strong data types to express speech recognition grammars in software programs, and the system for interpretation of natural language inputs to natural language enabled applications has a grammar, a source file, and a speech recognizer, wherein the grammar has a set of data types and semantic code defining rules about the set of data types, the source file includes computer readable code adapted to access the grammar by instantiating selected data types of the set of data types, and the speech recognizer is adapted to receive natural language input and to map the natural language input to the selected data types.

This prior art drives an operating system, application programs, other program modules, and program data, by recognizing voices, which is similar in part to the feature of the present invention that automatically carries out coding work by recognizing oral commands of the user.

However, because the present invention recognizes oral commands of the user in the manner of natural language processing, and based thereon, creates and executes programming codes and automatically processes the work of programming, when compared to the technological feature of the prior art that operates an operating system or various programs on a computer through speech recognition, the present invention is technically different in that the system recognizes oral commands of the user in the manner of the natural language processing, thereby enabling a simple processing of coding work using various programming languages.

The Korean Patent No. 1218332 (Jan. 21, 2013) relates to a hybrid-type method and apparatus for character input that receives at least two articulations that correspond to different pronunciations, and when an error occurs in the result of recognition of one articulation, the result of recognition of the other articulation is used.

The prior art provides the effects that in the case when a speech recognition error occurs on the first articulation received from the user, the second articulation with phonemes that corresponds to the pronunciation on which the speech recognition error occurred is received and learns the pronunciation that corresponds to the speech recognition error occurred through the speech recognition of the second articulation, thereby accurately analyzing the characteristics of the user pronunciations, and as such, it is similar in part to the feature of the present invention that recognizes oral commands in the manner of natural language processing.

However, the technological feature of the present invention that recognizes oral commands of the user to carry out the natural language processing, and creates and executes programming codes based thereon and automatically processes the work of programming using various programming languages is a unique characteristic feature of the present invention which is not mentioned at all in this prior art.

That is, each of the prior art references mentioned above presents a technological feature that executes an application program of a computer or a specific application on a mobile phone through speech recognition mostly, and thus the present invention that recognizes oral commands of the user in the manner of natural language processing, and creates and executes programming codes based thereon and automatically processes the work of programming using various programming languages that can automatically execute coding work using various programming languages such as C++, JAVA, Python, R-program is obviously technologically different.

SUMMARY OF THE INVENTION

Technical Task

The present invention was designed to solve the problems above, and has a purpose of providing a coding system and coding method with speech recognition that can perform coding work automatically by recognizing oral commands of a user.

Also, the present invention has another purpose of providing a coding system and coding method with speech recognition that can perform coding work automatically using programming language on Cloud by recognizing oral commands spoken by the user and carrying out natural language processing comprising morphological analysis, syntactic analysis, semantic analysis, discourse analysis or combinations thereof, and creating and executing a programming code based thereon.

Further, the present invention has another purpose of providing a coding system and coding method with speech recognition that can overcome the inconvenience of key input that may occur when students or programmers using content related to a program in a mobile environment are practicing programming or carrying out coding work.

Further, the present invention has yet another purpose of providing a coding system and coding method with speech recognition that can help disabled people with moving difficulties with programming education and work.

Means for Achieving the Task

A coding system with speech recognition according to one embodiment of the present invention comprises a programming element identifying unit for identifying programming elements comprising commands, functions, variables, constants or combinations thereof based on information on recognition of oral commands of the user; a programming code transforming unit for transforming the identified programming elements comprising commands, functions, variables, constants or combinations thereof into programming codes after combining them; a programming processing unit for providing a result of execution of the transformed programming codes to the user terminal.

In addition, the coding system further comprises a programming verifying unit for verifying the suitability of the programming codes transformed through the programming code transforming unit, and when the program preparation using speech recognition is completed in the user terminal, performing compiling and debugging.

In addition, the information on recognition of oral commands of the user is characterized by being a set consisting of meaningful words extracted through natural language processing analysis comprising morphemes, syntax, semantics, discourse or combinations thereof based on a sentence, wherein the sentence is recognized through a speech recognition server after an input of an oral signal of the user is received in a programming administration server from the user terminal through a network.

In addition, the information on recognition of oral commands of the user is characterized by being a set consisting of meaningful words extracted through natural language processing analysis comprising morphemes, syntax, semantics, discourse or combinations thereof based on a sentence, wherein the sentence is recognized after an input of an oral signal of the user is received on the user terminal, wherein the set is provided to a programming administration server from the user terminal through a network.

In addition, the programming code transforming unit transforms programming elements comprising commands, functions, variables, constants or combinations thereof that are listed after identified on the user terminal into programming codes that suit the grammar system of the programming language in consideration of table information stored in advance in a database.

In addition, the coding system further comprises a programming data administration unit for collecting oral information spoken by a plurality of users for each of programming elements comprising commands, functions, variables, constants or combinations thereof that are used in a specific programming language, analyzing the collected oral information and classifying it into similar words for each programming element, storing in a database, and administering, table information where the classified similar words are matched to their respective programming elements.

Further, a coding method using speech recognition according to one embodiment of the present invention comprises, in a programming administration server, identifying programming elements comprising commands, functions, variables, constants or combinations thereof based on information on recognition of oral commands of the user; in the programming administration server, transforming the identified programming elements comprising commands, functions, variables, constants or combinations thereof into programming codes after combining them; and in the programming administration server, programming processing to provide a result of execution of the programming codes transformed through the programming code transforming to the user terminal.

In addition, the coding method further comprises, in the programming administration server, verifying the programming code transformation to verify the suitability of the programming codes transformed through the programming code transforming, and in the programming administration server, programming verifying for performing compiling and debugging when a program preparation using speech recognition is completed in the user terminal.

In addition, the information on recognition of oral commands of the user is characterized by being a set consisting of meaningful words extracted through natural language processing analysis comprising morphemes, syntax, semantics, discourse or combinations thereof based on a sentence, wherein the sentence is recognized through a speech recognition server after an input of an oral signal of the user is received in a programming administration server from the user terminal through a network.

In addition, the information on recognition of oral commands of the user is characterized by being a set consisting of meaningful words extracted through natural language processing analysis comprising morphemes, syntax, semantics, discourse or combinations thereof based on a sentence, wherein the sentence is recognized after an input of an oral signal of the user is received on the user terminal, wherein the set is provided to a programming administration server from the user terminal through a network.

In addition, the programming code transforming transforms the programming elements comprising commands, functions, variables, constants or combinations thereof that are listed after identified on the user terminal into programming codes that suit the grammar system of the corresponding programming language in consideration of table information stored in advance in a database.

In addition, the coding method, in the programming administration server, further comprises collecting oral information spoken by a plurality of users for each of programming elements comprising commands, functions, variables, constants or combinations thereof that are used in a specific programming language, analyzing the collected oral information and classifying it into similar words for each programming element, storing in a database, and administering, table information where the classified similar words are matched to their respective programming elements.

Effect of the Invention

As explained above, according to the coding system and coding method of the present invention using speech recognition, because coding work can be automatically carried out by recognizing the oral command of the user on Cloud, the user can carry out the coding work simply through speech without a need for use of a separate input device such as a keyboard or a mouse, and the invention can be used with application of various programming languages.

Moreover, because students or programmers using programming content can easily practice programming or carry out coding work using oral commands according to the invention, the prevent invention can resolve the inconvenience of key input which may occur in practicing programming or carrying out coding work in a mobile environment.

Moreover, the present invention can be useful in programming education and software work targeting disabled people with moving difficulties, thereby contributing to public education on software.

Moreover, because coding work or practicing of a specific programming language is made by just oral commands of the user, even if the user does not know the programming language, coding work by speech recognition can be intuitively verified, helping understand the programming language or coding work.

Moreover, beyond the education of a specific programming language, an application in a mobile environment can be constructed, or a blog and a homepage can be designed, using only oral commands, and even for work that is difficult to express in words, it is possible to provide a program, through representative keywords spoken by the user, that is helpful to programming work, and thus it will significantly contribute to the development of all industries using programming languages.

BRIEF DESCRIPTION OF THE DRAWINGS

FIG. 6 is a drawing showing the natural language processing performed in the speech recognition processing unit of FIG. 5 above in more detail.

BEST MODES FOR CARRYING OUT THE INVENTION

Figure 1:
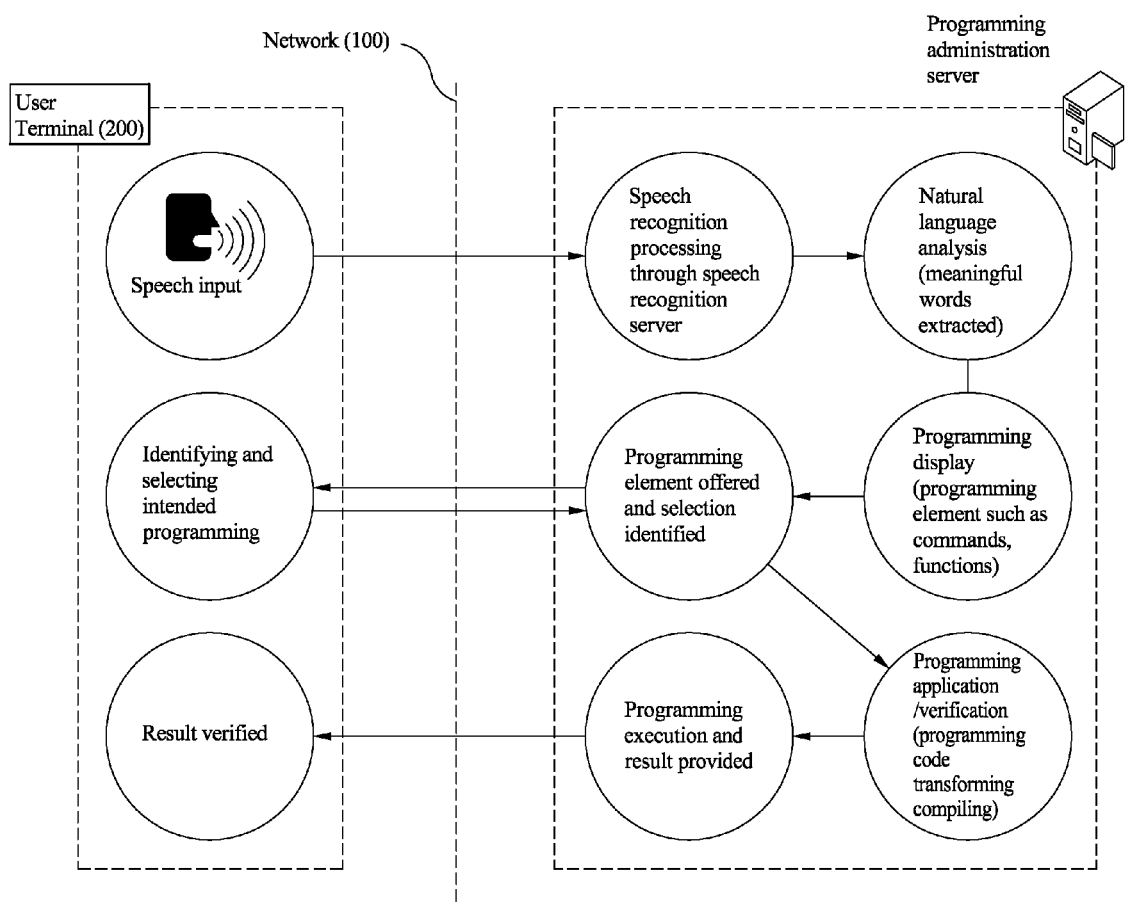
FIG. 1 is a conceptual diagram for explaining the coding process using speech recognition according to the present invention.

Hereinafter, preferable embodiments of the coding system and the coding method using speech recognition according to the present invention will be explained in more detail with reference to the attached drawings. For identical components on the drawings, identical reference numerals are used. Regarding the embodiments of the present invention in this text, particular structural and functional explanations are merely examples for the purposes of explaining embodiments of the present invention, and unless defined otherwise, all terms used here, including the technical or scientific terms, mean the same as understood by a skilled person in the art to which the present invention pertains. Generally used terms, such as terms defined in a dictionary, shall be construed as having the same meaning in the context of the related technology, and unless otherwise defined explicitly in the present application, they shall not be construed as having ideal or excessively formal meaning.

FIG. 1 is a conceptual diagram for explaining the coding process using speech recognition according to the present invention, and FIG. 2 is a drawing for explaining one embodiment of coding work using speech recognition according to the present invention.

Figure 2:
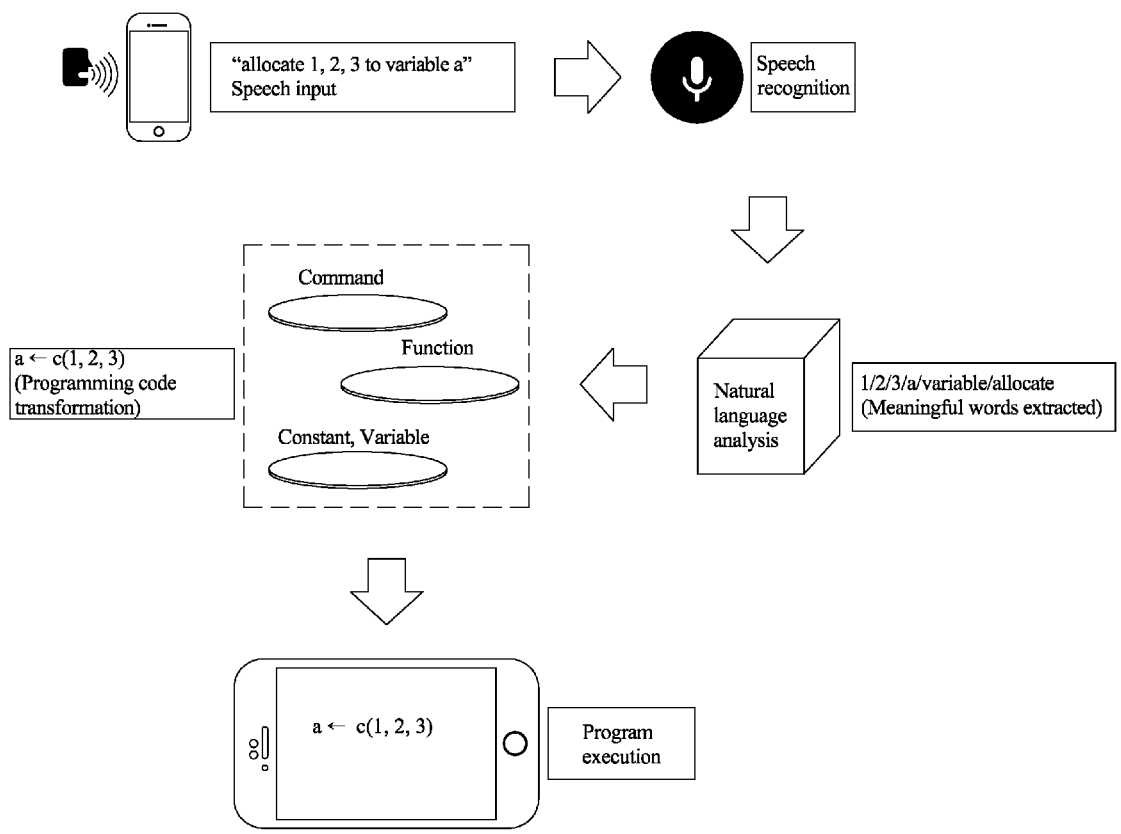
FIG. 2 is a drawing for explaining one embodiment of coding work using speech recognition according to the present invention.

As shown in FIG. 1, the programming administration server (300) for supporting users in programming exercise or coding work on Cloud based on speech recognition is constructed with a database of information matching words spoken by users to programming elements comprising commands, functions, variables, constants or combinations thereof for various programming languages such as currently used R-program, C++, JAVA and Python.

Moreover, the programming administration server (300), upon transmission of oral commands spoken by the user carrying out programming exercise or coding work from the user terminal (200), controls this so that a sentence can be recognized through a speech recognition server (400), and the sentence recognized in the speech recognition server (400) is processed using natural language processing to extract meaningful words. That is, meaningful words are extracted through morphological analysis, syntactic analysis, semantic analysis, discourse analysis or the like, from the sentence recognized in the speech recognition server (400). This method can be used when the specification of the user terminal (200) is low or when the speech recognition program cannot be directly used depending on the usage environment, and in the programming administration server that received an oral command of the user, the oral command of the user is recognized through the speech recognition server (400), and natural language processing is performed based thereon.

Moreover, the programming administration server (300) is constructed with a database with programming set code information for transforming programming elements that are matched to words extracted according to recognition of oral commands spoken by users into programming codes that suit the grammar system of the programming language.

Moreover, the programming administration server (300) supports users to provide applications or execution programs to be installed to the user terminal (200) such that the users can exercise various programming languages or use programming languages to carry out coding work based on speech recognition.

The user terminal (200) is a communication device such as a smartphone or a tablet computer possessed by users, wherein communication access is made with the programming administration server (300) through a network (100), and, if program commands that suit word roots which are extracted by processing oral commands of the user using natural language processing from the programming administration server (300) are transmitted, it lists them thus enabling the user to identify, and select, his or her intended program command, and the result (text, graph, etc.) of execution of the programming code processed based on selection of the user in the programming administration server (300) is transmitted for the user to identify. At this time, the user terminal (200) enables the user to make modifications while verifying whether the programming code has suitably been transformed according to the speech spoken by the user through interaction with the user.

Moreover, the user terminal (200) recognizes the speech spoken by the user carrying out programming exercise or coding work through natural language processing (that is, extracting meaningful words from a sentence spoken by the user through morphological analysis, syntactic analysis, semantic analysis, discourse analysis or the like) using speech recognition program provided on the device, and can transmit information on the meaningful words which are recognized speech information to the programming administration server (300). At this time, for recognition of oral commands of the user, a speech recognition program designed by the vendor of the programming administration server (300) provided on the user terminal (200) is used, or publicly known speech recognition programs such as Echo of Amazon or Siri of Apple are used.

Moreover, the user terminal (200) itself may process the work of coding a program on its own based on the speech spoken by the user carrying out programming exercise or coding work, without working with the programming administration server (300) as in the explanation above.

The process of programming exercise or coding work using such speech recognition is described in detail as follows.

Firstly, the user terminal (200) receives input of an oral command of the user through a microphone. At this time, the oral command of the user is for an exercise or coding work related to a specific programming language, for example, as in FIG. 2, it is inputted in a form of a sentence as in "allocate 1, 2, 3 to variable a."

If the user inputs the oral command, the user terminal (200) transmits the oral command of the user to the programming administration server (300), and the programming administration server (300) recognizes the oral command of the user through a speech recognition server (400), and extracts meaningful words from the sentence spoken by the user by analyzing the recognized sentence through natural language processing. For example, as in FIG. 2, by carrying out an analysis through natural language processing on "allocate 1, 2, 3 to variable a" inputted in a form of a sentence by the user, meaningful words such as "1, 2, 3, a, variable, allocate" are extracted.

After extracting the meaningful words, the programming administration server (300) identifies programming elements comprising various commands, functions, variables, constants or combinations thereof that are used in programming work based on the meaningful words which are information on recognition of oral commands of the user. That is, the programming administration server (300) matches the meaningful words of "1, 2, 3, a, variable, allocate" shown in FIG. 2 with the information on the programming elements comprising commands, functions, variables, constants or combinations thereof that are constructed in a database, and identifies the programming element of "a, ←, c(1, 2, 3)."

After identifying programming elements based on the information on recognition of oral commands of the user, the programming administration server (300) transmits the programming elements comprising commands, functions, variables, constants or combinations thereof to the user terminal (200) and enables the user to identify and select intended ones, and if the identification and selection by the user is made, the programming administration server (300) combines the programming elements comprising commands, functions, variables, constants or combinations thereof selected by the user and transforms them into programming codes. That is, the programming administration server (300) transforms the programming element of "a, ←, c(1, 2, 3)" shown in FIG. 2 into "a←c(1, 2, 3)" which suits the grammar system of the programming language in consideration of the programming code set information.

When the programming code transformation is made, the programming administration server (300) verifies for confirmation from the user as to whether the work of creating the programming code suitable for the speech spoken by the user is completed, and as a result of verification, if the work of code creation is completed through repetitive performance of programming code transformation, the programming administration server (300) verifies whether the prepared program has any error by compiling and debugging the program which is prepared by the speech of the user only.

If there is no error as a result of verification, the programming administration server (300) executes the program prepared by the user and provides the result of execution of the program to the user terminal (200) to verify whether a desired result is obtained by, thereby enabling the user to simply perform an exercise or coding work related to programming languages on its own user terminal (200).

Accordingly, the present invention enables users to simply perform an exercise or coding work using various programming languages with oral commands only, without using input devices such as a keyboard or a mouse.

Meanwhile, coding service based on speech recognition according to the present invention does not simply stop at education or exercise, but makes it possible to make various applications for a mobile environment, blogs and homepages with speech only. Moreover, even for work that is difficult to express in words, it is possible to provide a program, through representative keywords spoken by the user, that is helpful to programming work. For example, it would be possible to provide a general program that can create an application if the user makes an oral command such as 'create an application.'

Figure 3:
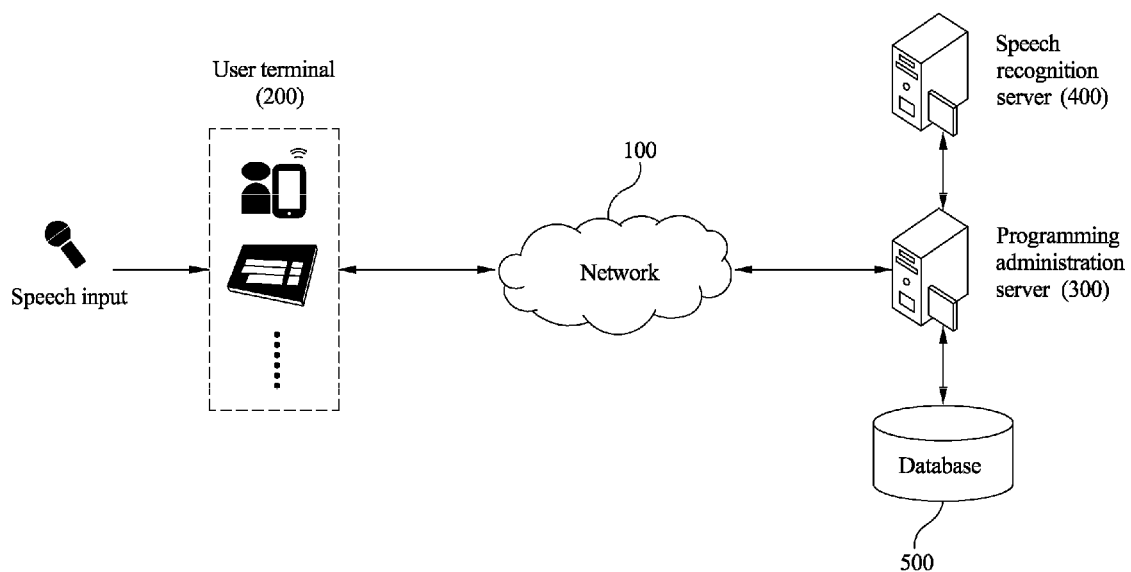
FIG. 3 is a drawing for schematically showing the configuration of the coding system using speech recognition according to one embodiment of the present invention.
Figure 4:
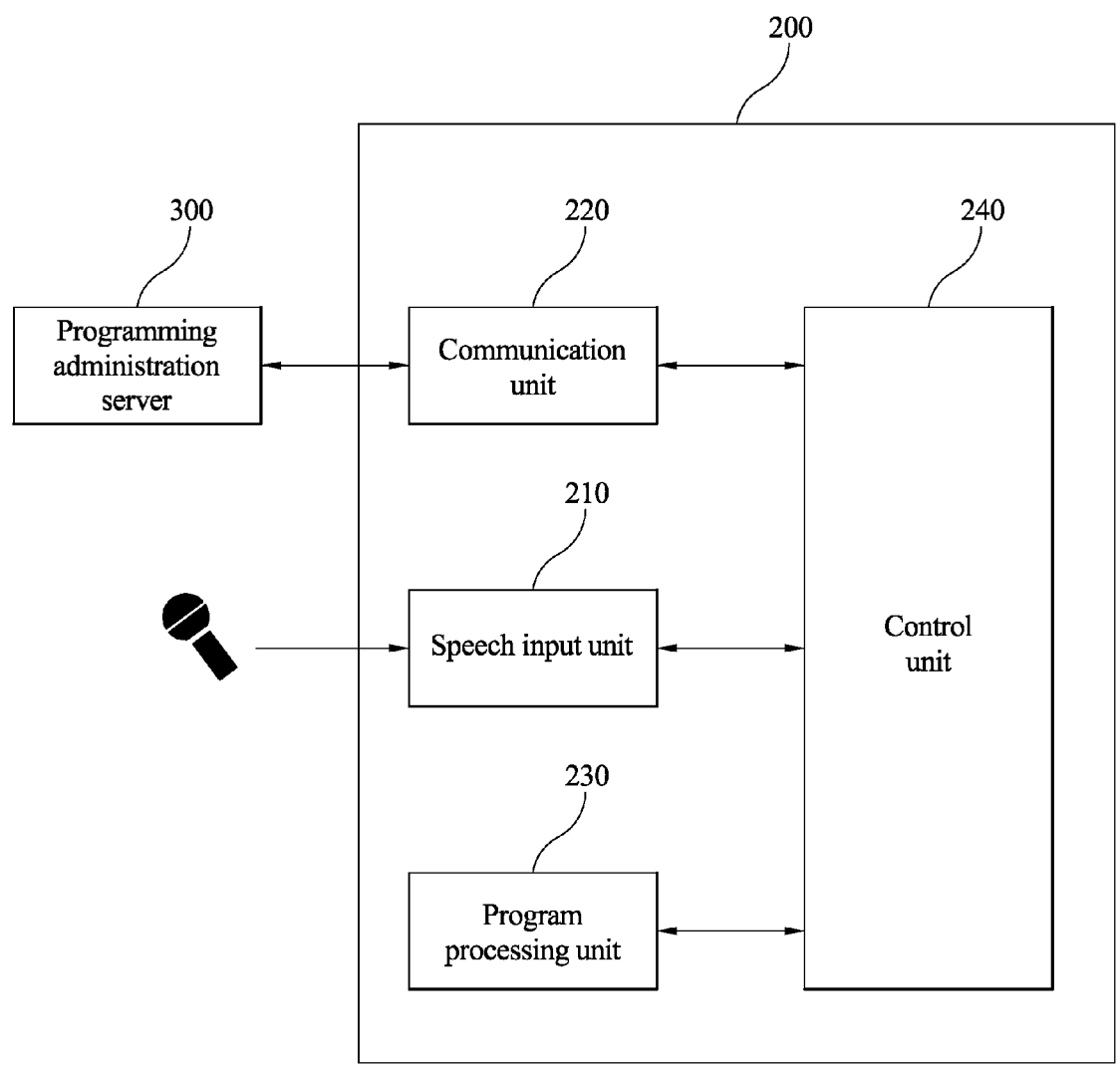
FIG. 4 is a drawing showing the configuration of the user terminal of FIG. 3 above in more detail.
Figure 5:
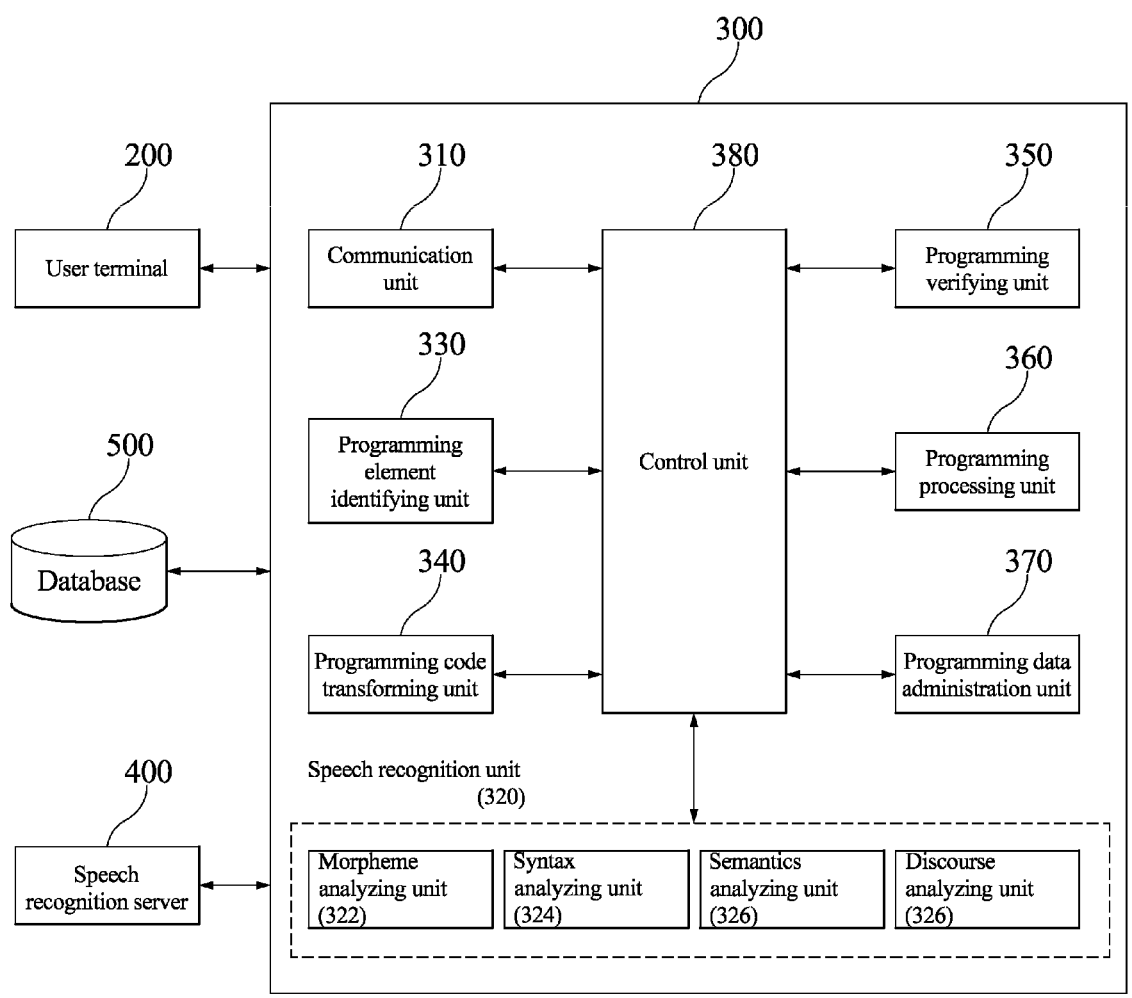
FIG. 5 is a drawing showing the configuration of the programming administration server of FIG. 3 above in more detail.
Figure 7:
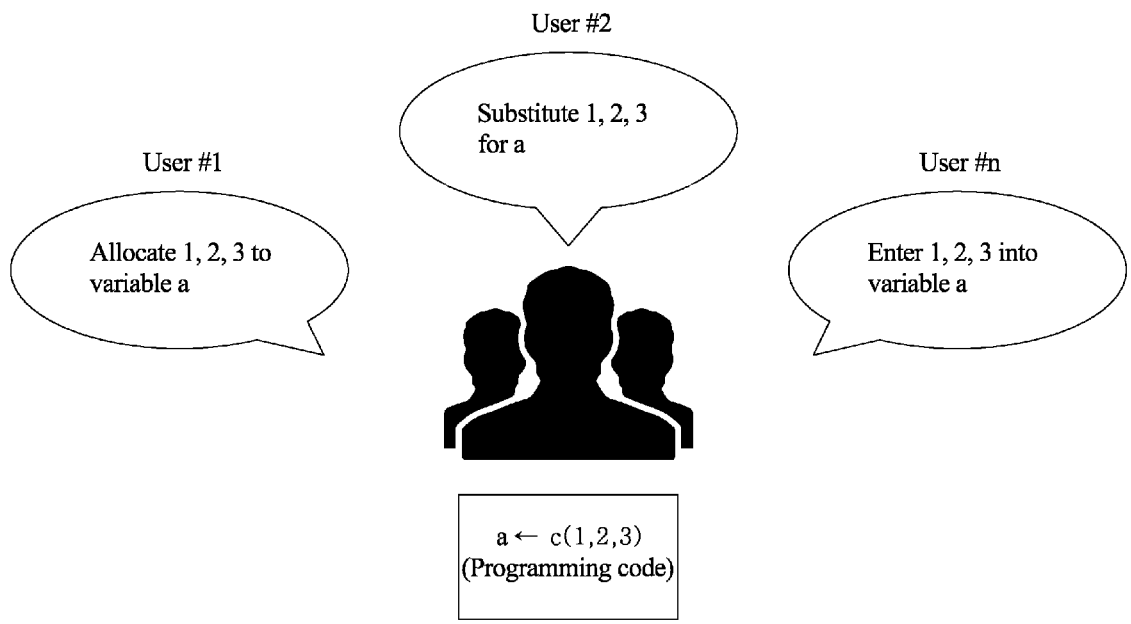
FIG. 7 is a drawing for explaining the diversity of speech input performed in the programming data administration unit of FIG. 5.

FIG. 3 is a drawing for schematically showing the configuration of the coding system using speech recognition according to one embodiment of the present invention. FIG. 4 is a drawing showing the configuration of the user terminal of FIG. 3 above in more detail. FIG. 5 is a drawing showing the configuration of the programming administration server of FIG. 3 above in more detail. FIG. 6 is a drawing showing the natural language processing performed in the speech recognition processing unit of FIG. 5 above in more detail. FIG. 7 is a drawing for explaining the diversity of speech input performed in the programming data administration unit of FIG. 5.

The coding system using speech recognition according to the present invention as shown in FIG. 3 comprises a network (100), a user terminal (200), a programming administration server (300), a speech recognition server (400), and a database (500), etc.

A network refers to various networks currently known, including wired/wireless internet, Bluetooth, beacon, RFID (Radio Frequency Identification, Zigbee, WiFi, etc., wherein a plurality of user terminals (200), a programming administration server (300), and a speech recognition server (400) are connected with a communication line therebetween, to have data communication between them in relation to the programming language related to information on recognition of oral commands of the user, programming exercise or coding work.

The user terminal (200) is a mobile communication device such as a smartphone and a tablet computer, wherein a microphone receiving the input of oral commands of the user is provided, and transmits the oral commands of the user inputted with the microphone to the programming administration server (300).

Moreover, the user terminal (200) receives programming elements comprising commands, functions, variables, constants or combinations thereof identified according to the oral command of the user from the programming administration server (300) through a network (100), and displays them on a screen, and the user who identifies this selects a programming element that suits his or her intention, transmits the selected information to the programming administration server (300).

In the description above, the oral command of the user is transmitted to the programming administration server (300) and the oral command of the user is directly recognized through the speech recognition server (400) in the programming administration server (300) and the work of programming coding is performed, but this is just an example for explanation purposes only; unlike this, if the user terminal (200) is equipped with a speech recognition program to extract meaningful words through natural language processing analysis, it is possible to recognize oral commands spoken by the user and extract meaningful words, which can be transmitted to the programming server (300) to perform the work of programming coding.

A program administration server (300) stores in a database (500), and administers, information of matching programming elements comprising commands, functions, variables, constants or combinations thereof on various programming languages such as R-program, C++, JAVA and Python, etc., with words extracted according to the recognition for oral commands spoken by users. And it stores in a database (500), and administers, programming code set information for transforming the at least one of the programming elements matched with the words extracted according to the recognition of oral commands spoken by users into a programming code that suits the grammar system of the corresponding programming language.

Moreover, when an oral command of a user is inputted through a network (100) from the user terminal (200), the programming administration server (300) recognizes it as a sentence through a speech recognition server (400), processes the recognized sentence with natural language processing to extract meaningful words, and then, it refers to the table information where the programming elements are matched with the respective words stored in the database (500)

so as to identify programming elements comprising commands, functions, variables, constants or combinations thereof that correspond to words included in the information on recognition of oral commands of the user. In addition, it transmits the identified programming elements comprising commands, functions, variables, constants or combinations thereof to the user terminal (200) to enable the user to select programming elements that suit his or her intention.

When programming elements are selected in the user terminal (200), the programming administration server (300) combines them in such a way to suit the grammar system of the programming language to transform to programming codes.

When the programming work based on speech recognition in the user terminal (200) is completed, the programming administration server (300) performs compiling and debugging of the program to verify whether the prepared program has any error, and if there is no error as a result of verification, executes the program and then provides the result of execution of the program to the user terminal (200) for the user to verify whether a desired result is obtained.

At this time, the information on recognition of oral commands of the user is a set consisting of meaningful words extracted through natural language processing analysis comprising morphemes, syntax, semantics, discourse or combinations thereof based on a sentence, wherein the sentence is recognized through a speech recognition server (400) after an input of an oral signal of a user is received in a programming administration server (300) from the user terminal (200) through a network (100).

Further, for the information on recognition of oral commands of the user, in addition to processing it in a programming administration server (300) as above, an oral signal of the user can be inputted in the user terminal (200) and meaningful words can be directly extracted through natural language processing analysis comprising morphemes, syntax, semantics, discourse or combinations thereof, and then the extracted meaningful words can be transmitted to the programming administration server (300).

That is, the recognition of oral commands of a user can use the way of extracting information on recognition of oral commands spoken by the user through a speech recognition server (400) in a programming administration server (300) that has received the oral commands of the user from the user terminal (200), or of extracting information on recognition of oral commands spoken by the user using a publicly known speech recognition program or a speech recognition program that is designed by the user himself or herself provided on the user terminal (200) and providing it to the programming administration server (300).

The database (500) stores and administers various data related to programming languages for performing programming exercise or coding work based on speech recognition.

For example, the database (500) stores and administers, not only various educational content necessary for programming exercise or coding work, but also table information where programming elements comprising commands, functions, variables, constants or combinations thereof are respectively matched with words extracted according to recognition for oral commands spoken by users, and programming code set information for transforming programming elements into programming codes that suit the grammar system of the programming language.

Meanwhile, the user terminal (200), as shown in FIG. 4, comprises speech input unit (210), communication unit (220), program processing unit (230) and control unit (240), etc.

The speech input unit (210) is a microphone provided on a user terminal (200), and performs the function of converting oral command inputted through the microphone into electrical signals so that a user can prepare programs with speech only in carrying out programming exercise or coding work.

The communication unit (220) performs communication access with the programming administration server (300) through a network (100), receives programming element information comprising commands, functions, variables, constants or combinations thereof based on information on recognition of oral commands of a user from the programming administration server (300), and outputs it to the control unit (240).

Further, the communication unit (220) transmits programming element information selected by the user identifying the programming element information to the programming administration server (300), and receives the result of execution of the program prepared according to the programming element selected by the user from the programming administration server (300) and outputs it to the control unit (240).

The program processing unit (230) displays on a screen, programming element information comprising commands, functions, variables, constants or combinations thereof identified based on the information on recognition of the oral commands of the user received from the programming administration server (300) through the communication unit (220), and enables the user to verify the result by displaying on a screen the result of execution of the program executed in the programming administration server (300) based on the selection by the user of the programming element information.

The control unit (240) takes the overall control of electrical signal conversion of oral commands spoken by a user in the speech input unit (210), transmission of oral commands of the user in the communication unit (220), receiving of programming element information comprising commands, functions, variables, constants or combinations thereof on oral commands of the user, transmission of information of the user's selection of programming elements and receiving of the result of program execution, display of programming element information comprising commands, functions, variables, constants or combinations thereof that has been identified according to oral commands of the user in the program processing unit (230) and display of the result of execution of a program prepared according to oral commands of the user, and the like.

Meanwhile, the programming administration server (300), as shown in FIG. 5, comprises communication unit (310), speech recognition processing unit (320), programming element identifying unit (330), programming code transforming unit (340), programming verifying unit (350), programming processing unit (360), programming data administration unit (370), control unit (380) and the like.

The communication unit (310) receives oral commands of the user from the user terminal (200) through a network (100) and outputs them to the control unit (380), and based on control of the control unit (380), transmits programming element information comprising commands, functions, variables, constants or combinations thereof that has been identified based on information on recognition of oral commands of the user and the result of execution of the program prepared based on the programming element selected by the user to the user terminal (200).

The speech recognition processing unit (320) carries out natural language processing analysis comprising morphemes, syntax, semantics, discourse or combinations thereof on the sentence for oral commands of the user that are received from the user terminal (200) and recognized through speech recognition server (400), thereby performing the function of extracting meaningful words from the sentence spoken by the user.

In more specific explanation with reference to FIG. 6, the speech recognition processing unit (320) comprises a morpheme analyzing unit (322) for dividing a sentence spoken by the user into morpheme units, a syntax analyzing unit (324) for identifying syntax units such as subject, object and predicate in a sentence spoken by the user, a semantics analyzing unit (326) for determining whether the sentence spoken by the user makes sense, and a discourse analyzing unit (328) for identifying the meaning of the sentence spoken by the user.

The programming element identifying unit (330) identifies programming elements comprising commands, functions, variables, constants or combinations thereof based on the information on recognition of oral commands of the user that are identified through the speech recognition server (400). That is, the programming element identifying unit (330) matches meaningful words which is information on recognition of oral commands of the user received from the user terminal (200) with the information on programming elements comprising commands, functions, variables, constants or combinations thereof for each word that are stored and administered in the database (500), and according to the match result, finds a programming element that corresponds to the oral command spoken by the user.

The programming code transforming unit (340) transforms programming element information provided through the programming element identifying unit (330) into programming codes by combining programming elements based on the selection of the identifying user. That is, in consideration of the table information stored in advance in a database (500) and based on selection of the user identifying programming elements comprising commands, functions, variables, constants or combinations thereof that are identified in the programming element identifying unit (330), it transforms programming element information into programming codes that suit the grammar system of the programming language.

For example, the programming code transformation according to the grammar system of the programming language processed in the programming code transformation unit (340) is performed through the comparison of table information matching programming elements comprising commands, functions, variables, constants or combinations thereof identified through the programming element identifying unit (330), and the position of each programming element and its combining relation according to the syntax, etc. of a specific programming language stored in advance, and administered, in the database (500) in the programming processing unit (360).

The programming verifying unit (350) verifies the suitability of the programming codes transformed through the programming code transforming unit (340), and when the program preparation using speech recognition is completed in the user terminal (200), performs compiling and debugging for any errors in the program.

The programming processing unit (360) provides information on the programming elements identified according to the information on recognition of oral commands of a user that is processed in the programming element identifying unit (330) to the user terminal (200) so that the user can prepare intended programs.

Moreover, the programming processing unit (360) performs the creation of table information where words extracted according to recognition of oral commands spoken by users are matched to programming elements comprising commands, functions, variables, constants or combinations thereof, and stores it in the database (500). In addition, it performs the creation of programming code set information for transforming the programming elements that are matched to the words extracted according to recognition of oral commands spoken by users into programming codes that suit the grammar system of the programming language, and stores it in the database (500).

The programming data administration unit (370) collects oral information spoken by a plurality of users for each of the programming elements comprising commands, functions, variables, constants or combinations thereof, analyzes the collected oral information, classifies it into similar words for each programming element, stores in a database (500), and administers, table information where the classified similar words are matched respectively to the programming elements.

For example, as shown in FIG. 7, a specific programming code of "a←c(1,2,3)" is given to a plurality of programmers and they are asked to read it, and speech information, such as "allocate 1, 2, 3 to variable a," "substitute 1, 2, 3 for a," and "enter 1, 2, 3 into variable a" spoken by each of the programmers, is received and analyzed in the programming data administration unit (370), which classifies it into similar words, and it matches the classified similar words to the programming elements, respectively, to be stored in the database (500), and thereby, the diversity of speech programming is secured.

The control unit (380) controls receiving of oral commands of the user in the communication unit (310) and the transmission of programming elements identified based thereon, receiving of information of programming elements selected by the user and the transmission of the result of execution of the program prepared based on the code transformation of the programming elements, recognition of a sentence through a speech recognition server (400) in the speech recognition processing unit (320), and natural language processing based thereon.

Moreover, the control unit (380) controls identifying of programming elements comprising commands, functions, variables, constants or combinations thereof based on information on recognition of oral commands of the user in the programming element identifying unit (330), and programming code transformation through combination of the programming elements in programming code transforming unit (340).

Moreover, the control unit (380) controls verifying programming codes, compiling and debugging programs prepared in the programming verifying unit (350), providing the user with programming element information in the programming processing unit (360), storing table information where programming elements are matched to words on oral commands spoken by the users and programming code set information on combination of programming elements that suit the grammar system, and securing the diversity of speech programming for a specific program code in the programming data administration unit (370).

Next, one embodiment of a coding method using speech recognition according to the present invention configured as above is explained in detail with reference to FIG. 8 and FIG. 9. At this time, the order of the steps according to the method of present invention may vary depending on a skilled person in the art or on the environment of usage.

Figure 8:
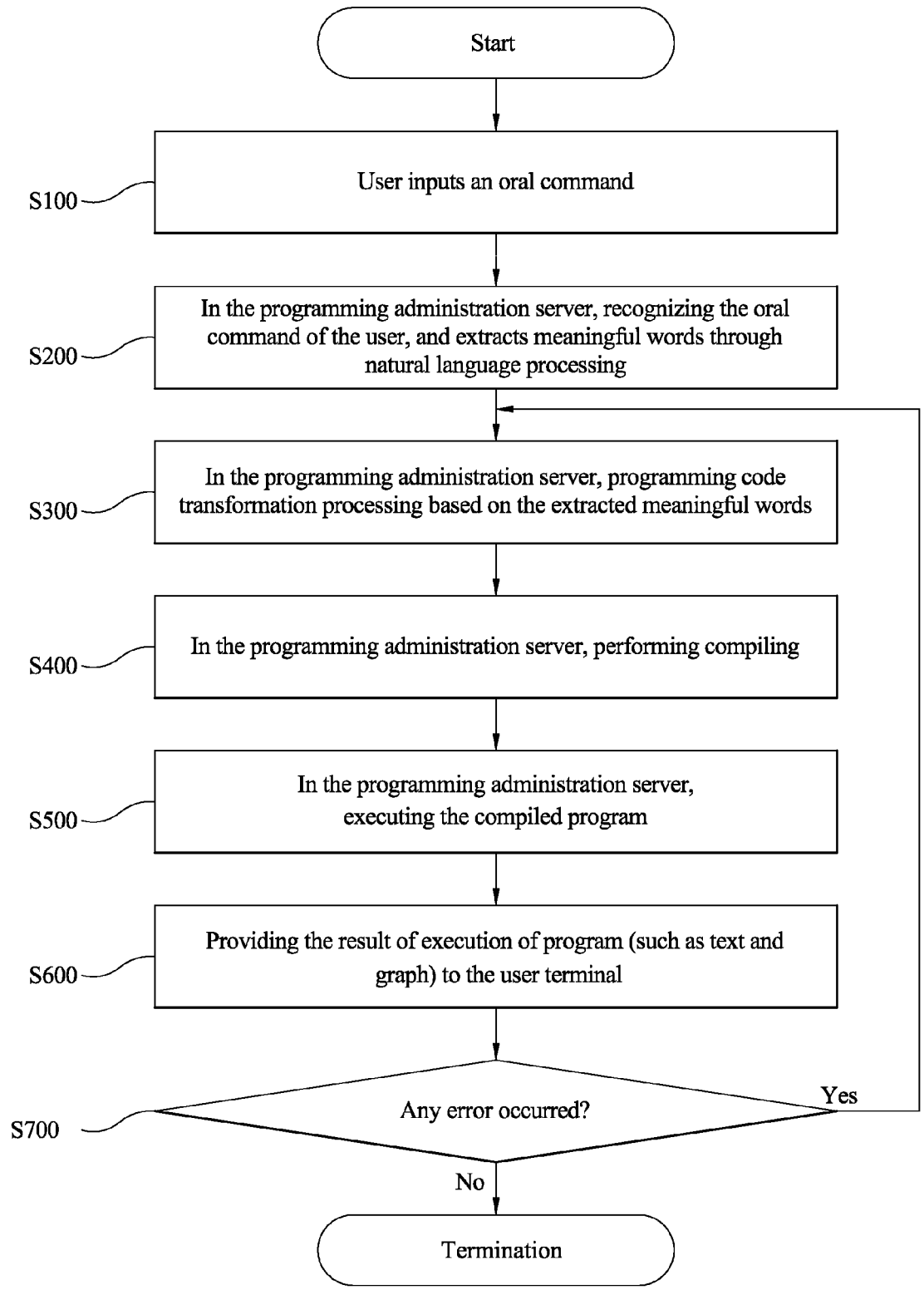
FIG. 8 is a flowchart showing operational process of the coding method using speech recognition according to one embodiment of the present invention in more detail.
Figure 9:
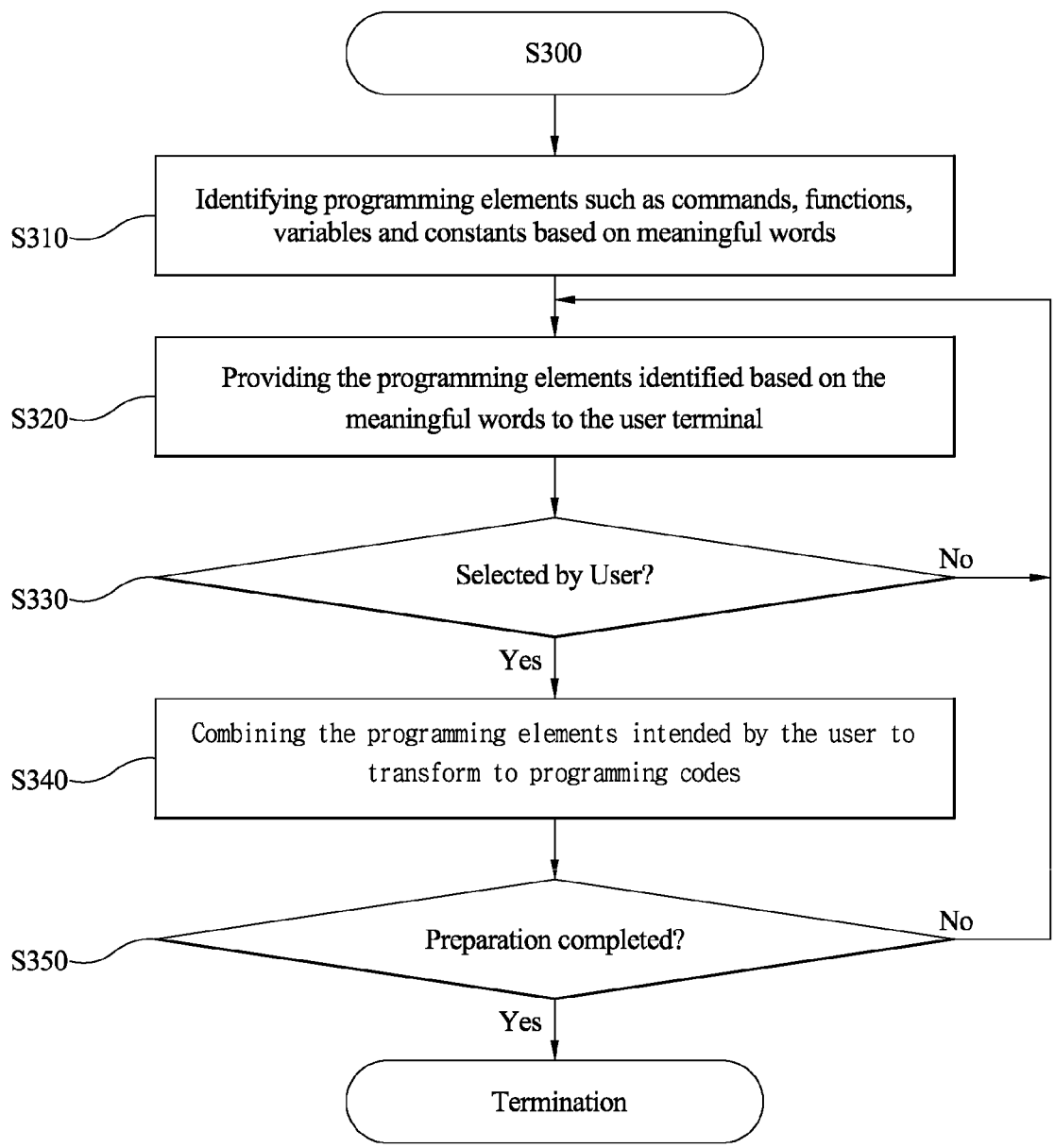
FIG. 9 is a flowchart showing the process of performing programming code transformation based on meaningful words of FIG. 8 above in more detail.

FIG. 8 and FIG. 9 are flowcharts showing operational process of a coding method using speech recognition according to one embodiment of the present invention in detail.

Firstly, the user terminal (200) receives an input of an oral command of a user through a microphone (S100). At this time, the oral command of the user is for an exercise or coding work related to a specific programming language and, for example, as in FIG. 2, it is inputted in a form of a sentence as in "allocate 1, 2, 3 to variable a."

When an oral command of the user is inputted through the step S100, the user terminal (200) transmits the oral command of the user to the programming administration server (300), and the programming administration server (300) recognizes the oral command of the user as a sentence through a speech recognition server (400), analyzes the recognized sentence through natural language processing, and extracts meaningful word information according to the result of the analysis (S200).

After extracting meaningful words through the natural language processing of step S200, the programming administration server (300) performs programming code transformation work based on the extracted meaningful words (S300).

To explain the step S300 in detail with reference to FIG. 9, the programming administration server (300) identifies programming elements comprising various commands, functions, variables, constants or combinations thereof that are used in programming work based on meaningful words which are information on recognition of oral commands of the user (S310).

And it transmits the programming elements comprising commands, functions, variables, constants or combinations thereof that are identified in the step S310 to the user terminal (200) through a network (100) (S320). Then, the user identifies whether it is the one that he or she has intended to determine to select programming elements (S330). That is, it enables the user to select programming elements listed according to the oral command spoken by the user to complete the program.

Once the selection by the user is made as a result of the determination at the step S330, the programming administration server (300) transforms the programming elements comprising commands, functions, variables, constants or combinations thereof selected by the user into programming codes which suit the grammar system of the corresponding programming language in consideration of the programming code set information stored in the database (500) (S240).

After the programming code transformation is made through the step 5340, the programming administration server (300) determines whether all program code transformation work has been terminated from the user, and repeats the process subsequent to the step S320 until the code transformation work is terminated.

Now, after performing the programming code transformation work based on the meaningful words according to oral commands of the user at the step S300, the programming administration server (300) verifies whether the program prepared by only the speech of the user has any error by performing compiling of the program (S400).

When the verification of the program prepared by only the speech of the user at the step S400 is completed, the programming administration server (300) executes the corresponding program S500, and provides information such as texts and graphics on the results of execution of the program to the user terminal (200), so that the user can identify the results of processing of the program (S600).

After providing the results of execution of the program, the programming administration server (300) determines whether any error has occurred in the result of processing of the program according to the selection of the user (S700), and if there is no error as a result of the determination, the use of the service related to the user's programming exercise is terminated, and if there is an error, the process subsequent to the step S300 is repeated.

As explained above, because the present invention automatically performs coding work by recognizing oral commands of the user, the users can carry out coding work simply through speech without a need for use of a separate input device, and the invention can be used with application of various programming languages.

Further, the inconvenience of key input, which may be needed when students or programmers are practicing programming or carrying out coding work in a mobile environment, can be overcome by the present invention, which can also help disabled people with moving difficulties with programming education and work.

As reviewed above, the present invention was described and illustrated with the preferred Embodiments, which are for explanation only, but a skilled person in the art to which the present invention pertains will readily understand that the invention can be implemented in various modifications and equivalent other examples from the above-described specific embodiments. Accordingly, the technological protective scope of the present invention shall be determined by the scope of the claims below.

[Explanations of Reference Numerals]

| | |
|---|---|
| 100: network | 200: user terminal |
| 210: speech input unit | 220: communication unit |
| 230: program processing unit | 230: program processing unit |
| 300: programming administration server | 240: control unit |
| 320: speech recognition processing unit | 322: morpheme analyzing unit |
| 324: syntax analyzing unit | 326: semantics analyzing unit |
| 328: discourse analyzing unit | 330: programming element identifying unit |
| 340: programming code transforming unit | 350: programming verifying unit |
| 360: programming processing unit | 370: programming data administration unit |
| 380: control unit | 400: speech recognition server |
| 500: database | |

What is claimed is:

1. A coding system with speech recognition comprising: a programming data administration unit that collects oral information spoken by a plurality of users for each of programming elements comprising at least one of commands, functions, variables, and constants that are used in a specific programming language, analyzes the collected oral information and classifies it into similar words for each programming element, stores in a database, and administers, table information where the classified similar words are matched to their respective programming elements; a programming element identifying unit that extracts information on recognition of oral commands from an oral signal spoken by a user based on the table information and identifies the programming elements based solely on the information on recognition of oral commands; a programming code transforming unit that combines the programming elements and transforms the programming elements into programming codes that suit a grammar system of a programming language based on consideration of a database of stored information; and a programming processing unit that provides a result of execution of the programming codes to a user terminal.

2. The coding system with speech recognition according to claim 1, further comprising:

a programming verifying unit that compiles and debugs the programming codes.

3. The coding system with speech recognition according to claim 1, characterized in that the information on recognition of oral commands of the user is a set consisting of meaningful words extracted through natural language processing analysis comprising morphemes, syntax, semantics, discourse or combinations thereof based on a sentence, wherein the sentence is recognized through a speech recognition server after an input of an oral signal of the user is received in a programming administration server from the user terminal through a network.

4. The coding system with speech recognition according to claim 1, characterized in that the information on recognition of oral commands of the user is a set consisting of meaningful words extracted through natural language processing analysis comprising morphemes, syntax, semantics, discourse or combinations thereof based on a sentence, wherein the sentence is recognized after an input of an oral signal of the user is received on the user terminal, wherein the set is provided to a programming administration server in the user terminal through a network.

5. A coding method using speech recognition comprising:
 in a programming administration server, collecting oral information spoken by a plurality of users for each of the programming elements comprising at least one of commands, functions, variables, constants that are used in a specific programming language, analyzing the collected oral information and classifying it into similar words for each programming element, storing in a database, and administering, table information where the classified similar words are matched to their respective programming elements;
 in the programming administration server, extracting information on recognition of oral commands from an oral signal spoken by a user based on the table information and identifying the programming elements based solely on the information on recognition of oral commands;
 in the programming administration server, combining the programming elements, and transforming the programming elements into programming codes that suit a grammar system of the programming language by referring to a database of information; and
 in the programming administration server, programming processing to provide a result of execution of the programming codes to the user terminal.

6. The coding method using speech recognition according to claim 5, further comprising:
 in the programming administration server, verifying the suitability of the programming codes transformed through the programming code transforming, and
 in the programming administration server, compiling and debugging the programming codes.

7. The coding method using speech recognition according to claim 5, characterized in that the information on recognition of oral commands of the user is a set consisting of meaningful words extracted through natural language processing analysis comprising morphemes, syntax, semantics, discourse or combinations thereof based on a sentence, wherein the sentence is recognized through a speech recognition server after an input of an oral signal of the user is received in a programming administration server from the user terminal through a network.

8. The coding method using speech recognition according to claim 5, characterized in that the information on recognition of oral commands of the user is a set consisting of meaningful words extracted through natural language processing analysis comprising morphemes, syntax, semantics, discourse or combinations thereof based on a sentence, wherein the sentence is recognized after an input of an oral signal of the user is received on the user terminal, wherein the set is provided to a programming administration server from the user terminal through a network.

\* \* \* \* \*